Figure 1:
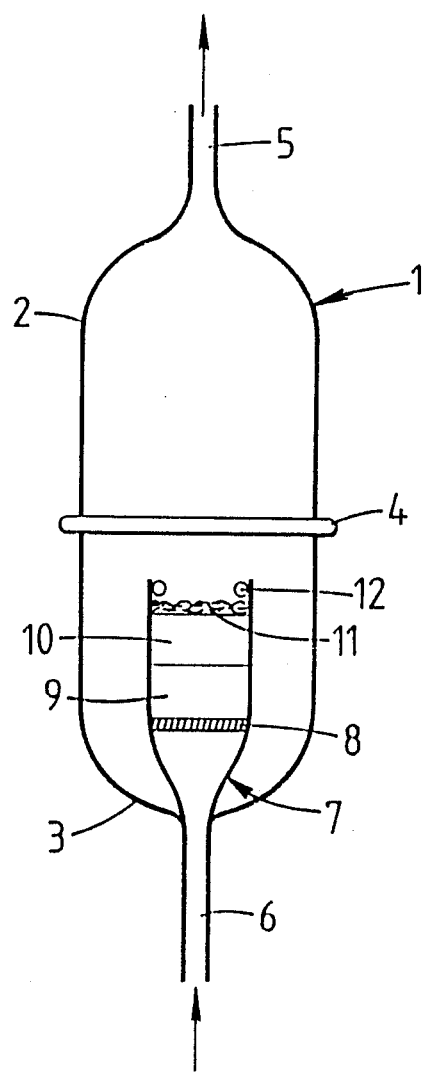

United States Patent [19]

Collins et al.

[11] Patent Number: 4,914,071
[45] Date of Patent: Apr. 3, 1990

[54] METHOD FOR PREPARING A CATALYST

[75] Inventors: Ann Collins, Feltham; Jonathon C. Frost, Chobham; Peter J. Price, Kingston-on-Thames, all of England

[73] Assignee: The British Petroleum Company p.l.c., London, England

[21] Appl. No.: 410,780

[22] Filed: Sep. 11, 1989

Related U.S. Application Data

[63] Continuation-in-part of Ser. No. 217,993, Jul. 12, 1988, abandoned.

[30] Foreign Application Priority Data

Jul. 14, 1987 [GB] United Kingdom ............... 8716565

[51] Int. Cl.$^4$ .................... B01J 21/18; B01J 23/62; A62D 9/00; B01D 53/36
[52] U.S. Cl. ..................... 502/185; 128/205.27; 423/247; 502/182
[58] Field of Search ............... 502/182, 185

[56] References Cited

U.S. PATENT DOCUMENTS

| 3,725,304 | 4/1973 | Wilhelm et al. | 208/139 |
|---|---|---|---|
| 3,794,599 | 2/1974 | Dautzenberg et al. | 252/466 |
| 3,842,017 | 10/1974 | Armistead | 252/474 |
| 4,117,082 | 9/1978 | Matmayama et al. | 423/427 |
| 4,185,082 | 5/1978 | Sinha | 423/437 |
| 4,317,460 | 3/1982 | Dale et al. | 131/334 |
| 4,524,051 | 6/1985 | Wright et al. | 423/427 |
| 4,572,178 | 3/1984 | Takasi et al. | 128/205.27 |
| 4,716,143 | 12/1987 | Imai et al. | 502/326 |

FOREIGN PATENT DOCUMENTS

| 0089183 | 9/1983 | European Pat. Off. . |
|---|---|---|
| 0107465 | 5/1984 | European Pat. Off. . |
| 0107471 | 5/1984 | European Pat. Off. . |
| 0116785 | 8/1984 | European Pat. Off. . |
| 0129406 | 12/1984 | European Pat. Off. . |
| 2345297 | 3/1974 | Fed. Rep. of Germany . |
| 2113354 | 6/1972 | France . |
| 2521873 | 8/1983 | France . |
| 37890 | 4/1974 | Japan .................. 423/427 |
| 50-137391 | 10/1975 | Japan . |
| 1348653 | 3/1974 | United Kingdom . |
| 1356383 | 6/1974 | United Kingdom . |
| 1393715 | 5/1975 | United Kingdom . |
| 2028571 | 3/1980 | United Kingdom . |
| 887853 | 7/1981 | United Kingdom . |
| 2070958 | 9/1981 | United Kingdom . |
| 1604082 | 12/1981 | United Kingdom . |
| 2083687 | 3/1982 | United Kingdom . |
| 2126205 | 3/1984 | United Kingdom . |
| 2134004A | 8/1984 | United Kingdom . |
| 2134413 | 8/1984 | United Kingdom . |

OTHER PUBLICATIONS

R. L. Moss, Experimental Methods in Catalytic Research, vol. 2, pp. 43–94.

G. C. Bond et al., in J. Chem. Soc. Chem Comm., 1975, pp. 796–797.

Primary Examiner—Paul E. Konopka
Attorney, Agent, or Firm—Larry W. Evans; Joseph G. Curatolo; Teresan W. Gilbert

[57] ABSTRACT

A method for preparing a catalyst suitable for oxidation of carbon monoxide comprises the steps of treating a high surface area carbon support with an aqueous solution of a stannic salt and a promoter, drying, reacting with hydrazine hydrate in a hydrocarbon, washing and drying. The catalyst may be used in breathing apparatus.

12 Claims, 1 Drawing Sheet

METHOD FOR PREPARING A CATALYST

This is a continuation-in-part of application Ser. No. 07/217,993 filed July 12, 1988, now abandoned.

The present invention relates to a method for preparing a catalyst and in particular to a method for preparing a catalyst suitable for oxidation of carbon monoxide.

Catalytic oxidation of carbon monoxide to carbon dioxide by reaction with oxygen is known in a number of applications. For example, it is known for the the recombination of carbon monoxide and oxygen which are produced by the breakdown of carbon dioxide in carbon dioxide lasers. Another applicaton is the removal of carbon monoxide from the feed gas in ammonia synthesis using an iron catalyst. Yet another application is the removal of carbon monoxide from the combustion products in cigarettes.

An important application is in breathing apparatus for use in confined spaces such as amines and in fire-related emergencies particularly in confined spaces where it is necessary to remove carbon monoxide from air before it is inhaled by individuals using the breathing apparatus. Carbon monoxide is toxic to humans in relatively low concentrations especially when breathed for a few minutes or more.

These applications present particular problems, for example, breathing apparatus applications require the catalyst to be active at around ambient temperatures and to be substantially dust free in operation.

UK patent application number GB 213400A relates to a method for preparing a supported tin (IV) oxide catalyst and UK patent number GB 2141349B relates to a breathing apparatus comprising a tin (IV) oxide catalyst promoted with a platinum group metal. To obtain high catalyst activity when supporting a catalyst on a porous support, such as carbon, it is important to have a high dispersion of the catalyst on the support. The method disclosed in GB 2134004A, which comprises contacting a substrate with a dispersion of colloidal or non-colloidal particles, has the disadvantage that the necessary high dispersion on the support may not be achieved if the pore sizes are smaller than the dispersed particles being applied.

The FIGURE comprises a glass vessel (1) comprising two parts (2) (3); an upper part (2) and a lower part (3). The two parts are held together with a gasket (4) to seal them. The upper part (2) has a gas outlet (5) and the lower part (3) has a gas inlet (6). In the lower part (3) a glass holder (7) is provided over the inlet (6). The holder has a glass sinter (8) on top of which can be placed layers of charcoal cloth (9), layers of catalyst (10) and a stainless steel gauze (11); the whole being held in position by an 'O' ring (12).

Thus, according to the present invention there is provided a method for preparing a catalyst suitable for oxidation of carbon monoxide comprising the steps of (a) treating a high surface area carbon support with an aqueous solution comprising a soluble stannic salt and a promoter, comprising one or more salts of the platinum group of metals (b) drying the material from step (a), (c) immersing the material from step (b) in a hydrocarbon and reacting it with hydrazine hydrate with vigorous agitation to convert the stannic salt to stannic oxide, (d) washing the material from step (c), and (e) drying the material from step (d) so as to form a catalyst containing 0.5 to 10% by weight of each platinum group metal and 10 to 30% by weight of stannic oxide.

Preferably, the high surface area carbon support is subjected to a pre-treatment stage comprising the steps of (x) treating the high surface area carbon support with an aqueous solution of nitric acid, (y) washing the material from step (x), and (z) drying the material from step (y).

The high surface area carbon suport may be carbon granules or carbon fibre cloth. The high surface area carbon support may be a woven carbon fibre cloth. Preferably, the cloth has a bimodal pore size distribution with pore diameters in the range 7 to 12 angstroms and 15 to 32 angstroms and a surface area of about 1200 $m^2/g$ for example as supplied by Charcoal Cloth Ltd. (e.g. ref. no. FMI/700).

Preferably, the stannic salt is stannic chloride but other soluble stannic salts may be used. The promoter used is one or more salts of the platinum group of metals. The promoter may comprise a palladium salt and preferably comprises a palladium salt and a platinum salt. The platinum group of metals is defined as consisting of platinum, palladium, osmium, iridium, ruthenium and rhenium. Suitable promoters are palladium nitrate and chloroplatinic acid but other alternatives includes tetramine platinum (II) chloride, platinum nitrate, palladium chloride and other water soluble platinum or palladium salts.

The support may be treated with the solution in step (a) by immersing it in the solution. Preferably, the support is immersed in the solution for a known time before being removed to allow excess solution to drip off the support. It is believed that there may be differential uptake of the salts during the immersion. Therefore the immersion time is selected to give the required uptake of salts.

In step (b), the material is dried, for example in a vacuum oven at 800mbara at ambient temperature for 16 hours.

In step (c) preferably the hydrocarbon is hexane. The reaction in step (c) is preferably conducted at ambient temperature for 1 hour. The hydrazine is in excess. The reaction may be conducted with the hexane at reflux temperature.

In step (d), preferably the hydrocarbon is decanted off and then the material is washed with copious amounts of distilled water.

In step (e), preferably the material is heated in a stream of dry air at a temperature not in excess of 200° C. for at least 2 hours. The air is dried over activated silica gel. Preferably, the material is heated in a stream of dry air at B 150 $cm^3$ $min^{-1}$ in a Pyrex tube and is heated from ambient to 200° C. at 10° C. $min^{-1}$ before being held at 200° C. for 2 hours.

Preferably, the support is treated with the aqueous solution of nitric acid in step (x) by immersing it in the solution. Preferably, the nitric acid solution is 2.5% v/v and the support is immersed in the solution for 2 hours at ambient temperature. Elevated temperature may be used. It is not necessary to agitate the solution other than to ensure that the support is in intimate contact with the solution.

Preferably in step (y), the material is removed from the nitric acid solution before being thoroughly washed with water. The water may be deionised or distilled water.

In step (z), the material is preferably dried to a constant weight, for example by heating for 3 hours at 100° C. in a vacuum oven at 800mbara. Most preferably, the material is not heated above 300° C.

The catalyst prepared by this method suitably contains 0.5 to 10.0 weight % of each platinum group metal and 10 to 30 weight % of stannic oxide.

It is envisaged that catalyst prepared by the method may be used for reactions involving the oxidation of carbon monoxide by oxygen by contacting the catalyst with the carbon monoxide. It may also be used for the oxidation of hydrocarbons.

The catalyst may be used for removing carbon monoxide from air by passing the air containing the carbon monoxide over the catalyst. In particular, the catalyst may be used in a filter in breathing apparatus for converting carbon monoxide to carbon dioxide. Such breathing apparatus may include protective hoods or face masks for use in confined spaces such as mines or in fire-related emergencies. The catalyst may also be used in air conditioning systems, for example in cars, to protect the occupants from the effects of automotive pollution.

In the present invention it is believed that the use of a solution gives a relatively more even and more effective dispersion of the stannic oxide than the known methods of using colloidal or non-colloidal particles. Also, the use of a chloride containing solution does not appear to significantly adversely affect the catalyst.

The invention will now be described by way of example only and with reference to the accompanying drawing which shows in cross-section an apparatus for testing the catalyst.

Catalyst Testing Procedure

The apparatus used to test the catalyst is shown in the accompanying drawing. It comprises a glass vessel (1) comprising two parts (2) (3); an upper part (2) and a lower part (3). The two parts are held together with a gasket (4) to seal them. The upper part (2) has a gas outlet (5) and the lower part (3) has a gas inlet (6). In the lower part (3) a glass holder (7) is provided over the inlet (6). The holder has a glass sinter (8) on top of which can be placed layers of charcoal cloth (9), layers of catalyst (10) and a stainless steel gauze (11); the whole being held in position by an 'O' ring (12).

In use, 10 layers of charcoal cloth (9) were placed over the sinter (8) and then 10 layers of catalyst (10) to be tested. The layers were held in place by the stainless steel gauze (11) and 'O' ring (12).

A test gas containing 1% v/v carbon monoxide, 3.5% v/v carbon dioxide and the balance air was saturated with water by passing it through a bubbler (not shown) at ambient temperature and was then introduced through the gas inlet (6). Gas from the outlet (5) was analysed by a gas chromatograph (not shown).

The gas was passed into the inlet (6) at ambient temperature for 10 minutes at 330 cm$^3$ min$^{-1}$ and then for 11 minutes at 980 cm$^3$ min$^{-1}$ and the conversion of carbon monoxide calculated from the periodic analysis of the gas from the outlet.

EXAMPLE 1

A solution of the catalyst was prepared by dissolving stannic chloride (26.9 g, AR quality), palladium chloride (0.65 g) and chloroplatinic acid (1.04 g) in water (100 ccs). A piece (2.9 g) of cloth fabricated from carbon fibres (such as is supplied commercially by Charcoal Cloth Ltd.) which had been washed in 5% nitric acid and then washed with water and dried, was immersed in the catalyst solution for a period of about 30 minutes. The cloth was then removed from the solution and dried for 16 hours at a temperature of about 110° C.

The cloth was then immersed in hexane (150 cc, AR quality) and hydrazine hydrate (100%) was added at ambient temperature whilst stirring vigorously until effervescence ceased. The temperature of the hexane was then raised to 50° C. for about 15 minutes. The cloth was then removed and washed with copious amounts of distilled water. The catalyst impregnated cloth was then dried for about 16 hours at about 110° C.

EXAMPLE 2

A high surface area carbon fibre cloth (4 g) supplied by Charcoal Cloth Ltd. reference number FMI/700 was immersed in a 2.5% v/v aqueous nitric acid soltion for 2 hours at ambient temperature. The cloth was then removed from the acid solution and thoroughly washed with distilled water before being dried to a constant weight at 100° C. in a vacuum oven at 800 mbara pressure.

The dried cloth was then dipped for 30 seconds in a solution containing 47 g stannic chloride ($SnCl_4.5H_2$), 3 g chloroplatinic acid ($H_2PtCl_6$) and 1.3 g palladium as palladium nitrate ($Pd(NO_3)_2$) in 100 ml of solution. The cloth was then removed from the solution and dried at ambient temperature in a vacuum oven at 800mbara.

The impregnated cloth was immersed in hexane (500 cm$^3$) and hydrazine hydrate (two 10 cm$^3$ aliquots) was added. The solution was agitated for 1 hour at ambient temperature. The cloth was removed from the hexane, washed with distilled water and then heated in a stream of dry air (150 cm$^3$ min$^{-1}$) at 200° C. for 2 hours.

The catalyst was tested according to the Catalyst Test Procedure hereinbefore described. At the end of the first 10 minutes of gas flow at 330 cm$^3$ min$^{-1}$ the conversion of carbon monoxide was measured by the gas chromatograph to be 98.5%. When the gas flow was increased the conversion of carbon monoxide after 11 minutes at 980 cm$^3$ min$^{-1}$ was 96.6%. Xray fluorescence (XRF) analysis of the catalyst gave 18.4 weight % of tin (in the form of stannic oxide), 4.7 weight % of palladim as metal and 2.3 weight % platinum as metal.

EXAMPLE 3

Example 2 was repeated using a different drying procedure after removal of the cloth from the solution: that is dried at 50° C. in a vacuum oven at 800 mbara. XRF analysis of the catalyst gave 19.4 weight % tin, 4.5 weight % palladium and 18 weight % platinum.

EXAMPLE 4

The catalyst preparation described in Example 2 was repeated except that the initial treatment with aqueous nitric and solution, washing and drying was not performed. When this catalyst was tested according to the Catalyst Testing Procedure as hereinbefore described, the conversion of carbon monoxide was 98.4% after the first 10 minutes at 330 cm$^3$ min$^{-1}$ gas flow but fell to 85.0% after 11 minutes at 980 cm'min$^{-1}$.

EXAMPLE 5

The catalyst preparation described in Example 2 was repeated except that the cloth was finally dried not at 200° C. for 2 hours but at 100° C. in a vacuum oven. When this catalyst was tested according to the Catalyst Testing Procedure as hereinbefore described the conversion of carbon monoxide was 97.7% after the first 10

EXAMPLE 6

The catalyst preparation described in Example 2 was repeated except that only 22 g of stannic chloride was used instead of 47 g. When this catalyst was tested according to the Catalyst Test Procedure as hereinbefore described, the conversion of carbon monoxide was 99.3% after the first 10 minutes at 330 cm$^3$ min$^{-1}$ gas flow and 99.5% after 11 minutes at 980 cm$^3$ min$^{-1}$. XRF analysis of the catalyst gave 14.5 weight % tin, 4.2 weight % palladium and 3.1 weight % platinum.

EXAMPLE 7

The catalyst preparation described in Example 2 was repeated except that 2.6 g of palladium was used as palladium nitrate. XRF analysis of the resulting catalyst gave 15.8 weight % tin, 7.7 weight % palladium and 2.2 weight % platinum. When this catalyst was tested according to the Catalyst Testing Procedure as hereinbefore described the conversion of carbon monoxide was 97.8% after the first 10 minutes at 330 cm$^3$ min$^{-1}$ gas flow and 97.9% after 11 minutes at 980 cm$^3$ min$^{-1}$.

EXAMPLE 8

The catalyst preparation described in Example 7 was repeated except that the charcoal cloth was soaked in the impregnation solution for 30 minutes instead of 30 seconds. XRF analysis of the resulting catalyst gave 12.2 weight % tin, 5.6 weight % palladium and 20 weight % platinum. When this catalyst was tested according to the Catalyst Testing Procedure as hereinbefore described the conversion of carbon monoxide was 98.8% after 10 minutes at 330 cm$^3$ min$^{-1}$ gas flow and 99.4% after 11 minutes at 980 cm$^3$ min$^{-1}$ gas flow.

We claim:

1. A method for preparing a catalyst suitable for oxidation of carbon monoxide comprising the steps of (a) treating a high surface area carbon support with an aqueous solution comprising a soluble stannic salt and a promoter, said promoter being one or more salts of the platinum group of metals (b) drying the material from step (a), (c) immersing the material from step (b) in a hydrocarbon and reacting it with hydrazine hydrate with vigorous agitation to convert the stannic salt to stannic oxide, (d) washing the material from step (c), and (e) drying the material from step (d) so as to form a catalyst comprising 0.5 to 10% by weight of each platinum group metal and 10 to 30% by weight of stannic oxide.

2. A method for preparing a catalyst according to claim 1 in which the high surface area carbon support is subjected to a pre-treatment stage comprising the steps of (x) treating the high surface area carbon support with an aqueous solution of nitric acid, (y) washing the material from step (x), and (z) drying the material from step (y).

3. A method for preparing a catalyst according to claim 1 in which the carbon support is a high surface area carbon fibre cloth.

4. A method for preparing a catalyst according to claim 1 in which the stannic salt is stannic chloride.

5. A method of preparing a catalyst according to claim 1 in which the catalyst comprises 0.5 to 5.0% by weight platinum group metal and 10 to 30% by weight stannic oxide.

6. A method for preparing a catalyst according to claim 1 in which the promoter comprises a palladium salt.

7. A method for preparing a catalyst according to claim 1 in which the promoter comprises a palladium salt and a platinum salt.

8. A method for preparing a catalyst according to claim 1 in which in step (c) the hydrocarbon is hexane.

9. A method for preparing a catalyst according to claim 8 in which in step (c) the reaction is conducted with the hexane at reflux temperature.

10. A method for preparing a catalyst according to claim 1 in which in step (e) the material is heated in a stream of dry air at a temperature not in excess of 200° C., for at least 2 hours.

11. A method for preparing a catalyst according to claim 10 in which in step (e) the material is heated in a stream of dry air at 200° C. for 2 hours.

12. A method for preparing a catalyst according to claim 2 in which the carbon support is a high surface area carbon fibre cloth.

* * * * *